US012624317B2

(12) United States Patent
Hu et al.

(10) Patent No.: US 12,624,317 B2
(45) Date of Patent: May 12, 2026

(54) METHOD OF REDUCING DEFECTS ON POLISHED WAFERS

(71) Applicant: Fujifilm Electronic Materials U.S.A., Inc., N. Kingstown, RI (US)

(72) Inventors: Bin Hu, Chandler, AZ (US); Binh Duong, Gilbert, AZ (US); Carl Ballesteros, San Tan Valley, AZ (US); Yannan Liang, Gilbert, AZ (US); Hyosang Lee, Chandler, AZ (US)

(73) Assignee: Fujifilm Electronic Materials U.S.A., Inc., North Kingstown, RI (US)

( * ) Notice: Subject to any disclaimer, the term of this patent is extended or adjusted under 35 U.S.C. 154(b) by 566 days.

(21) Appl. No.: 18/081,738

(22) Filed: Dec. 15, 2022

(65) Prior Publication Data

US 2023/0193168 A1 Jun. 22, 2023

Related U.S. Application Data

(60) Provisional application No. 63/292,511, filed on Dec. 22, 2021.

(51) Int. Cl.
*C11D 7/32* (2006.01)
*C11D 7/50* (2006.01)

(52) U.S. Cl.
CPC .............. *C11D 7/32* (2013.01); *C11D 7/5004* (2013.01); *C11D 2111/22* (2024.01)

(58) Field of Classification Search
CPC ...... C11D 7/32; C11D 7/5004; C11D 2111/22
See application file for complete search history.

(56) References Cited

U.S. PATENT DOCUMENTS

| | | | | |
|---|---|---|---|---|
| 6,004,399 | A * | 12/1999 | Wong | H01L 21/67051 134/25.4 |
| 6,468,362 | B1 * | 10/2002 | Chen | B08B 3/02 134/28 |
| 2001/0022186 | A1 | 9/2001 | Mertens et al. | |
| 2005/0064703 | A1 * | 3/2005 | Kondo | C23C 18/1653 257/E21.585 |
| 2005/0287928 | A1 | 12/2005 | Hardikar et al. | |
| 2006/0237033 | A1 | 10/2006 | Yi et al. | |
| 2010/0006124 | A1 * | 1/2010 | Achkire | H01L 21/67034 134/25.4 |
| 2015/0000711 | A1 * | 1/2015 | Brown | H01L 21/67057 134/95.2 |

FOREIGN PATENT DOCUMENTS

| | | |
|---|---|---|
| WO | WO 2002/047139 | 6/2002 |
| WO | WO 2003/041131 | 5/2003 |
| WO | WO 2013/141395 | 9/2013 |

OTHER PUBLICATIONS

Wikipedia, "Tetramethyl ammonium hydroxide" via https://en.wikipedia.org/wiki/Tetramethylammonium_hydroxide (Year: 2025).*
Supelco iso-propyl Alcohol Histology Grade [2-Propanol via https://www.sigmaaldrich.com/US/en/sds/mm/px1830?userType=anonymous (Year: 2025).*
International Search Report and Written Opinion in International Appln. No. PCT/US2022/052982, mailed on Apr. 10, 2023, 10 pages.
Millipore Sigma, [online] "Tetramethylammonium hydroxide," Product datasheet, 2020, retrieved from URL<https://www.emdmillipore.com/US/en/product/Tetramethylammonium-hydroxide,MDA_CHEM-814748>, 2020, 3 pages.
National Center for Biotechnology Information, [online] "Isopropyl Alcohol" Pubchem, Sep. 16, 2004, retrieved from URL<https://pubchem.ncbi.nlm.nih.gov/compound/3776>, 174 pages.
National Center for Biotechnology Information, [online] "Tetraalkylammonium hydroxide," Pubchem, Jul. 19, 2005, retrieved from URL<https://pubchem.ncbi.nlm.nih.gov/compound/60966>, 59 pages.
Extended European Search Report in European Appln No. 22912313.8, dated Apr. 22, 2025, 9 pages.

* cited by examiner

*Primary Examiner* — Binh X Tran
(74) *Attorney, Agent, or Firm* — Fish & Richardson P.C.

(57) ABSTRACT

This disclosure relates to a method that includes applying a polishing composition to a surface of a substrate; bringing a pad into contact with the surface of the substrate and moving the pad in relation to the substrate to create a polished substrate; treating the polished substrate with a rinse solvent; flowing a vapor over a meniscus formed at an interface between air and the rinse solvent on the polished substrate. The vapor includes a first component containing a water miscible organic solvent, a second component containing a cleaning agent, and a third component containing an inert gas.

18 Claims, No Drawings

METHOD OF REDUCING DEFECTS ON POLISHED WAFERS

CROSS-REFERENCE TO RELATED APPLICATION

The present application claims priority to U.S. Provisional Application Ser. No. 63/292,511, filed on Dec. 22, 2021, the contents of which are hereby incorporated by reference in their entirety.

BACKGROUND

As semiconductor device geometries continue to decrease, the importance of ultra clean processing increases as even small amounts of contaminants/residue can dramatically impact device performance. Compared with other processing steps, chemical mechanical polishing/planarization (CMP) is a highly contaminating process because the substrate is contacted with a polishing composition that includes abrasives (inorganic particles) and chemical components that act on the substrate surface, both of which can leave behind residue/contamination. Post-chemical mechanical polishing (pCMP) and/or aqueous cleaning within a tank of fluid (or a bath) followed by a rinsing bath (e.g., within a separate tank, or by replacing the cleaning tank fluid) may be employed to try to remove defects after a polishing step. After removal from the rinsing bath, absent use of a drying apparatus, bath fluid may evaporate from the substrate's surface and cause streaking, spotting and/or leave bath residue on the surface of the substrate. Such streaking, spotting and residue can cause subsequent device failure. Accordingly, much attention has been directed to improved methods for drying a substrate as it is removed from an aqueous bath. Moreover, the aqueous cleaning steps taken prior to the rinse bath (e.g., post-CMP cleaning and/or using an aqueous cleaning tank) may not adequately clean organic or inorganic residue left behind from the CMP processes performed on the wafer.

A method known as Marangoni drying (also referred to as surface tension gradient drying or IPA vapor drying) creates a surface tension gradient to induce bath fluid to flow from the substrate in a manner that leaves the substrate virtually free of bath fluid, and thus may avoid streaking, spotting and residue marks.

Achieving uniform Marangoni drying of a substrate can be difficult and in some cases particles from the bath fluid may re-attach to, and thus contaminate, the substrate in addition to any contamination that might remain after the post-polish cleaning steps. As such, methods for reducing defects during substrate rinsing and/or drying could be useful to the semiconductor industry.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, this disclosure features a method that includes (1) applying a polishing composition to a surface of a substrate; (2) bringing a pad into contact with the surface of the substrate and moving the pad in relation to the substrate to create a polished substrate; (3) treating the polished substrate with a rinse solvent; and (4) flowing a vapor over a meniscus formed at an interface between air and the rinse solvent on the polished substrate. The vapor can include a first component containing a water miscible organic solvent, a second component containing a cleaning agent, and a third component containing an inert gas.

Other aspects and advantages of the claimed subject matter will be apparent from the following description and the appended claims.

DETAILED DESCRIPTION

Embodiments disclosed herein relate generally to methods of polishing a substrate and drying said polished substrate (e.g., a polished semiconductor substrate). As mentioned above, with the continued miniaturization of feature size in advanced semiconductor components, the minimization of defects on semiconductor substrates during the multitude of production steps involved in their production has taken on heightened importance. This increased importance has promoted a flurry of activity in the post-CMP cleaning field, with new cleaner formulations developed for the brush box cleaning that commonly takes place after a polished substrate is removed from the polishing platen of a polishing machine and interest in methods of "buffing" polished substrates while they are still on the polishing platen with formulations that include substantially zero abrasives. However, even after all of the above steps have been performed, residues/contaminants (e.g., organic residue, pad residue, inorganic/abrasive residue) still commonly exist on the polished substrates.

To reduce these persistent contaminants and thereby improve the device yield of polished substrates, the present inventors have developed a method that includes adding a cleaning agent to the volatile vapor that is used in the substrate drying step (e.g., a vapor drying step), which is typically the final step performed after a polished substrate has been processed via CMP and the various stages of pCMP cleaning. In some embodiments, the vapor drying step involves Marangoni drying (described above) where an aqueous rinse solution is dried from the polished substrate by the action of a vapor at a meniscus formed at an interface between air and a rinse bath or solvent on the processed substrate. In some embodiments, in addition to the cleaning agent, the vapor can include a mixture of nitrogen gas and isopropyl alcohol (IPA), although compounds other than IPA may be chosen if they have a high vapor pressure leading to no risk of residue/contamination from the vapor itself.

Significantly, the present inventors have discovered that the addition of a volatile amine compound as a cleaning agent to the vapor mixture can surprisingly reduce the amount of defects observed on polished wafers following the Marangoni drying step. One unique aspect of this invention is that all, or substantially all, of the solutions (e.g., CMP polishes, pCMP cleans, rinses. etc.) that come in contact with the polished substrate prior to the Marangoni vapor drying are aqueous, while the vapor used for Marangoni drying is an organic based vapor (e.g., including nitrogen gas and a volatile organic compound) allowing for the implementation of organic compounds that can have high substrate cleaning capabilities but are incompatible with aqueous solutions (i.e., non-soluble or minimally soluble). Further, the addition of a cleaning agent to the vapor mixture can be employed in any application that utilizes Marangoni drying of a substrate (e.g., those applications that employ a waterfall apparatus instead of a rinse bath).

In one or more embodiments, a method of the present disclosure includes applying a polishing composition to a surface of a substrate, bringing a pad into contact with the surface of the substrate and moving the pad in relation to the substrate to create a polished substrate, treating the polished substrate with a rinse solvent, flowing a vapor at a meniscus formed at an interface between air and the rinse solvent on the polished substrate, wherein the vapor comprises: a first component comprising a water miscible organic solvent, a second component comprising a cleaning agent, and a third component comprising an inert gas. In one or more embodiments, the method further includes mixing the inert gas with a concentrate to form the vapor, wherein the concentrate comprises the first component and the second component.

In general, the substrate that is polished is not limited and can include any of the following materials: silicon oxides (e.g., tetraethyl orthosilicate (TEOS), high density plasma oxide (HDP), high aspect ratio process oxide (HARP), or borophosphosilicate glass (BPSG)), spin on films (e.g., films based on inorganic particle or films based on cross-linkable carbon polymer), silicon nitride, silicon carbide, high-K dielectrics (e.g., metal oxides of hafnium, aluminum, or zirconium), silicon (e.g., polysilicon, single crystalline silicon, or amorphous silicon), carbon, metals (e.g., tungsten, copper, cobalt, ruthenium, molybdenum, titanium, tantalum, or aluminum), metal nitrides (e.g., titanium nitride or tantalum nitride), and mixtures or combinations thereof. The polishing composition used for the polishing process can vary depending on the type of substrate being polished, but generally includes an aqueous dispersion of abrasive particles and chemical additives (e.g., corrosion inhibitors, surfactants, water-soluble polymers, oxidizing agents, and pH adjusting agents such as acids or bases) tailored for the desired polishing outcome.

After the polishing process is complete, the polished substrate can be treated with a rinse solvent. In some embodiments, the polished substrate can be placed or immersed into a rinse bath containing at least one (e.g., two or three) rinse solvent to remove contaminants/residue from the polished substrate. An example of a rinse solvent is water (e.g., deionized water). In some embodiments, the rinse bath can include additives (e.g., a mixture of water-soluble cleaning additives) in addition to the rinse solvent. In one or more embodiments, the polished substrate can undergo pCMP cleaning steps prior to being treated with a rinse solvent. For example, the polished substrate can be subjected to pCMP cleaning such as brush-box processing and/or aqueous cleaning bath solutions prior to being treated with a rinse solvent.

In one or more embodiments, after the polished substrate is cleaned by the rinse bath, the polished substrate can be removed from the rinse bath (which includes a rinse solvent) either by lifting the polished substrate from the rinse bath or draining the rinse bath past the polished substrate. In one or more embodiments, the polished substrate can be removed from the rinse bath while flowing (e.g., spraying) a vapor over the polished substrate (e.g., over a meniscus formed at an interface between air and the rinse bath on the polished substrate). In one or more embodiments, the vapor can be sprayed over the polished substrate by using one or more spray nozzles. In one or more embodiments, the vapor can be flowed in the direction that the rinse bath is removed from the polished substrate. Without wishing to be bound by theory, it is believed that the vapor can be absorbed along the surface of the rinse bath, where the concentration of the absorbed vapor is higher at the tip of the meniscus than in the bulk of the rinse bath. Because the vapor has a lower surface Tension than water, the higher concentration of absorbed vapor can render the surface tension to be lower at the tip of the meniscus than in the bulk of the rinse bath, which in turn causes the rinse bath to flow from the drying meniscus toward the bulk rinse bath. Without wishing to be bound by theory, it is believed that such a vapor drying process can significantly reduce streaks, spotting, or bath residue on the substrate. Further, compared to a conventional vapor drying process, the vapor drying process described herein applies a cleaner directly to the wafer, which reduces the possibility for reattachment of particles and/or residues as the wafer is being withdrawn or the rinse bath is removed away from wafer.

In one or more embodiments, the vapor described herein can include a first component containing a water miscible organic solvent, a second component containing a cleaning agent, and a third component containing an inert gas.

In one or more embodiments, the first component (i.e., water miscible organic solvent) has a vapor pressure at 20° C. from at least about 1 kPa (e.g., at least about 2 kPa, at least about 5 kPa, at least about 10 kPa, at least about 20 kPa, at least about 40 kPa, at least about 50 kPa, at least about 60 kPa, at least about 80 kPa, or at least about 100 kPa) and/or at most about 250 kPa (e.g., at most about 240 kPa, at most about 220 kPa, at most about 200 kPa, at most about 180 kPa, at most about 160 kPa, at most about 150 kPa, at most about 140 kPa, at most about 120 kPa, or at most about 100 kPa). Without wishing to be bound by theory, it is believed that water miscible organic solvents that have a vapor pressure in the above range have the requisite characteristics to achieve the drying effect required to dry a substrate previously contacted with an aqueous rinse bath. In one or more embodiments, the first component can include an alcohol, an ether, a ketone, an ester, or a mixture thereof. In one or more embodiments, the first component is selected from the group consisting of ethanol, isopropyl alcohol, propylene glycol n-propyl ether, n-methylpyrrolidone, acetone, tetrahydrofuran, isopentyl acetate, and mixtures thereof.

In one or more embodiments, the second component (i.e., a cleaning agent) in the vapor described herein can include at least one (e.g., two or three) organic base that includes at least one (e.g., two or three) nitrogen atoms. Without wishing to be bound by theory, it is believed that compounds that fit this general description can act as cleaning agents when present within the vapor used to dry a substrate previously contacted with an aqueous rinse solvent. In one or more embodiments, the second component can include an amine (e.g., an alkylamine or a cyclic amine), a tetraalkylammonium hydroxide, a piperidine, a guanidine, a morpholine, or a mixture thereof. In some embodiments, the second component can include an organic base that has one to six (e.g., two, three, four, or five) carbon atoms. In some embodiments, the second component can optionally include at least one (e.g., two or three) oxygen atoms. Suitable examples of the second component include a tetraalkylammonium hydroxide, 1-methylpiperidine, 4-methylpiperidine, 1,1,3,3,-tetramethylguanidine, morpholine, piperidine, 3-methoxypropylamine, dipropylamine, isopropylamine, and mixtures thereof. In one or more embodiments, the tetraalkylammonium hydroxide is selected from the group consisting of tetramethylammonium hydroxide, tetraethylammonium hydroxide, tetrabutylammonium hydroxide, ethyltrimethylammonium hydroxide, diethyldimethylammonium hydroxide, and mixtures thereof.

In one or more embodiments, the second component in the vapor described herein can have a boiling point ranging from at least about 30° C. (e.g., at least about 35° C., at least about 40° C., at least about 50° C., at least about 60° C., at least about 70° C., at least about 80° C., at least about 90° C., or at least about 100° C.) to at most about 170° C. (e.g., at most about 165° C., at most about 160° C., at most about 150° C., at most about 140° C., at most about 130° C., at most about 120° C., at most about 110° C., at most about 110° C.) under a pressure of 1 atm. In one or more embodiments, the second component can have a molecular weight from at least about 50 g/mol (e.g., at least about 60 g/mol, at least about 70 g/mol, at least about 80 g/mol, at least about 90 g/mol, at least about 100 g/mol) to at most about 150 g/mol (e.g., at most about 140 g/mol, at most about 130 g/mol, at most about 120 g/mol, at most about 110 g/mol, or at most about 100 g/mol).

Without wishing to be bound by theory, it is believed that using a vapor containing a cleaning agent in the methods described herein can significantly reduce the amount of defects (e.g., residues and/or contaminants such as organic residue, pad residue, and/or inorganic or abrasive residue) on a polished substrate compared to using a vapor without such a cleaning agent.

In one or more embodiments, the vapor described herein can be formed by mixing an inert gas with a concentrate containing the first component and the second component. In one or more embodiments, the second component can range from at least about 0.001 wt % (e.g., at least about 0.005 wt %, at least about 0.01 wt %, at least about 0.05 wt %, at least about 0.1 wt %, at least about 0.5 wt %, or at least about 1 wt %) to at most about 5 wt % (e.g., at most about 4 wt %, at most about 3 wt %, at most about 2 wt %, at most about 1 wt %, at most about 0.5 wt %, or at most about 0.1 wt %) of the concentrate. In one or more embodiments, the first component can range from at least about 95 wt % (e.g., at least about 96 wt %, at least about 97 wt %, at least about 98 wt %, at least about 99 wt %, at least about 99.5 wt %, or at least about 99.9 wt %) to at most about 99.999 wt % (e.g., at most about 99.99 wt %, at most about 99.9 wt %, at most about 99.5 wt %, at most about 99 wt %, at most about 98 wt %, or at most about 96 wt %) of the concentrate.

In one or more embodiments, the concentrate can range from at least about 0.001 wt % (e.g., at least about 0.01 wt %, at least about 0.1 wt %, at least about 1 wt %, at least about 5 wt %, at least about 10 wt %, at least about 20 wt %, at least about 30 wt %, at least about 40 wt %, or at least about 50 wt %) to at most about 90 wt % (e.g., at most about 80 wt %, at most about 70 wt %, at most about 60 wt %, at most about 50 wt %, at most about 40 wt %, at most about 30 wt %, at most about 20 wt %, or at most about 10 wt %) of the vapor described herein.

In one or more embodiments, the third component in the vapor described herein can include an inert gas selected from the group consisting of nitrogen, helium, argon, and mixtures thereof. In one or more embodiments, the inert gas can range from at least about 10 wt % (e.g., at least about 20 wt %, at least about 30 wt %, at least about 40 wt %, at least about 50 wt %, at least about 60 wt %, at least about 70 wt %, at least about 80 wt %, at least about 90 wt %, or at least about 95 wt %) to at most about 99.999 wt % (e.g., at most about 99.99 wt %, at most about 99.9 wt %, at most about 99.5 wt %, at most about 99 wt %, at most about 98 wt %, at most about 95 wt %, at most about 90 wt %, at most about 80 wt %, at most about 70 wt %, at most about 60 wt %, or at most about 50 wt %) of the vapor described herein.

In one or more embodiments, the flow rate of the vapor can range from at least about 0.01 (e.g., at least about 0.05, at least about 0.1, at least about 0.5, at least about 1, at least about 5, at least about 10, at least about 15, at least about 20, or at least about 25) standard liter per minute to at most about 50 (e.g., at most about 45, at most about 40, at most about 35, at most about 30, at least about 25, at least about 20, at least about 15, at least about 10, or at least about 5) standard liter per minute. Without wishing to be bound by theory, it is believed that, if the flow rate of the vapor exceeds 50 standard liter per minute, the vapor may not form a homogenous coating on the meniscus and the cost for the drying process may be too high due to the greater amount of vapor used. On the other hand, without wishing to be bound by theory, it is believed that, if the flow rate of the vapor is lower than 0.01 standard liter per minute, the vapor may not produce sufficient defect reduction effects.

In one or more embodiments, the vapor drying methods described herein can reduce a defect count by at least 10% compared to a similar method without including a cleaning agent in the vapor. The defect reduction can be assessed by measuring total defect counts (TDC; which can include particles, scratches, organic residues, corrosion marks, water mark, and/or chatter marks) on polished substrates before and after subjecting the polished substrates to the rinse solvent and vapor drying methods described herein.

In one or more embodiments, the methods described herein can further include producing a semiconductor device from a polished substrate treated by the methods described herein through one or more additional steps. For example, photolithography, ion implantation, dry/wet etching, plasma etching, deposition (e.g., PVD, CVD, ALD, ECD), wafer mounting, die cutting, packaging, and testing can be used to produce a semiconductor device from a substrate treated by the methods described herein.

EXAMPLES

Example 1

In this example, blanket polysilicon wafers were first polished in a Reflexion device under the same conditions (e.g., slurry, downforce, pad, etc.). After the polishing process, the wafers were transferred to the vapor drying module included in the post-CMP Desica® Cleaner unit (i.e., no brush scrubbing was performed) where they were immersed in a deionized water rinse bath before being withdrawn from the rinse bath while a vapor was flowed over a meniscus formed on the polysilicon wafer at an interface between air and the deionized water of the rinse bath. The composition of the vapor used in the vapor drying was varied to determine the effect of adding a cleaning additive to the vapor during the vapor drying process. Specifically, the vapor of the Comparative Example was formed from a concentrate including only isopropyl alcohol. The vapor of Example 1 was formed from a concentrate including isopropyl alcohol and 0.2 wt % of an alkylamine with a molecular weight of less than 100 g/mol. The vapor of Example 2 was formed from a concentrate including isopropyl alcohol and a cyclic amine containing compound. All three vapors were formed under the same conditions by mixing nitrogen (which served as the inert carrier gas) with a concentrate. The cleaning efficiency (i.e., % defect reduction based on the TDC directly after polishing and TDC directly after vapor drying) of each of the three tested compositions is shown in Table 1 below.

TABLE 1

| | Cleaning Efficiency |
|---|---|
| Comparative Example | 13.5% |
| Example 1 | 98.3% |
| Example 2 | 84.6% |

The results show that the addition of a cleaning additive to the conventionally used isopropyl alcohol significantly reduced the TDC on the polished polysilicon wafers.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method, comprising:

applying a polishing composition to a surface of a substrate;

bringing a pad into contact with the surface of the substrate and moving the pad in relation to the substrate to create a polished substrate;

treating the polished substrate with a rinse solvent;

mixing an inert gas with a concentrate to form a vapor, wherein the concentrate comprises a first component comprising a water miscible organic solvent and a second component comprising a cleaning agent; and flowing the vapor over a meniscus formed at an interface between air and the rinse solvent on the polished substrate.

2. The method of claim 1, wherein the first component has a vapor pressure at 20° C. from about 1 kPa to about 250 kPa.

3. The method of claim 1, wherein the first component is selected from the group consisting of ethanol, isopropyl alcohol, propylene glycol n-propyl ether, n-methylpyrrolidone, acetone, tetrahydrofuran, isopentyl acetate, and mixtures thereof.

4. The method of claim 1, wherein the second component is from about 0.001 wt % to about 5 wt % of the concentrate.

5. The method of claim 1, wherein the concentrate is from about 0.001 wt % to about 90 wt % of the vapor.

6. The method of claim 1, wherein the inert gas is selected from the group consisting of nitrogen, helium, argon, and mixtures thereof.

7. The method of claim 1, wherein the rinse solvent comprises water.

8. The method of claim 1, wherein the vapor has a flow rate from about 0.01 to about 50 standard liter per minute.

9. The method of claim 1, wherein flowing the vapor is performed by spraying the vapor over the meniscus.

10. The method of claim 1, further comprising forming a semiconductor device from the substrate.

11. The method of claim 1, wherein the second component is an organic base that includes nitrogen.

12. The method of claim 11, wherein the organic base has a molecular weight at most about 150 g/mol.

13. The method of claim 11, wherein the organic base has a boiling point of from about 30° C. to about 170° C. at a pressure of 1 atm.

14. The method of claim 1, wherein the second component is selected from the group consisting of a tetraalkylammonium hydroxide, 1-methylpiperidine, 4-methylpiperidine, 1,1,3,3,-tetramethylguanidine, morpholine, piperidine, 3-methoxypropylamine, dipropylamine, isopropylamine, and mixtures thereof.

15. The method of claim 14, wherein the tetraalkylammonium hydroxide is selected from the group consisting of tetramethylammonium hydroxide, tetraethylammonium hydroxide, tetrabutylammonium hydroxide, ethyltrimethylammonium hydroxide, diethyldimethyl-ammonium hydroxide, and mixtures thereof.

16. The method of claim 1, wherein treating the polished substrate with a rinse solvent comprises placing the polished substrate into a rinse bath comprising the rinse solvent.

17. The method of claim 16, further comprising removing the polished substrate from the rinse bath while flowing the vapor.

18. The method of claim 17, wherein the vapor is flowed over the meniscus formed at an interface between air and the rinse solvent while removing the polished substrate from the rinse bath, and the vapor is flowed in the direction that the rinse solvent is removed from the polished substrate.

* * * * *